J. E. HARVEY.
ELECTRIC HEATER.
APPLICATION FILED MAR. 9, 1912.
1,033,799.
Patented July 30, 1912.
2 SHEETS—SHEET 1.
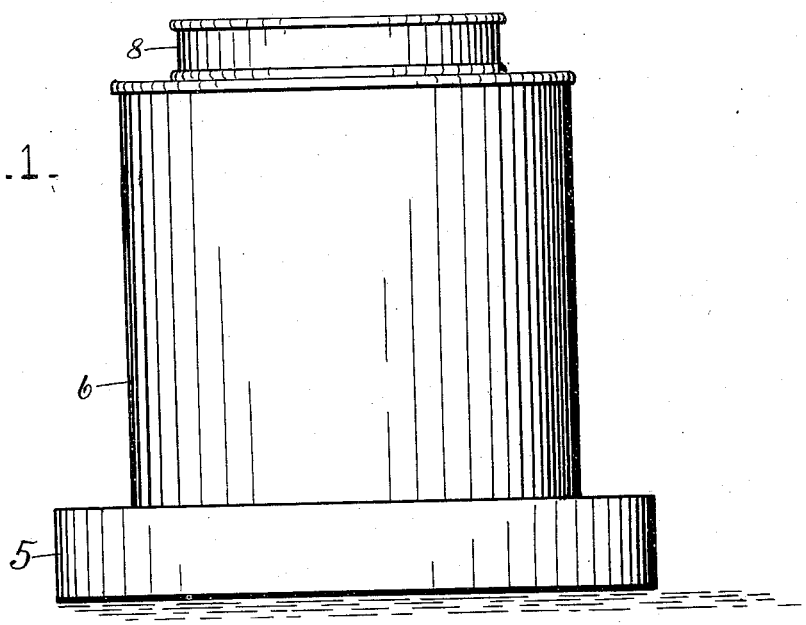
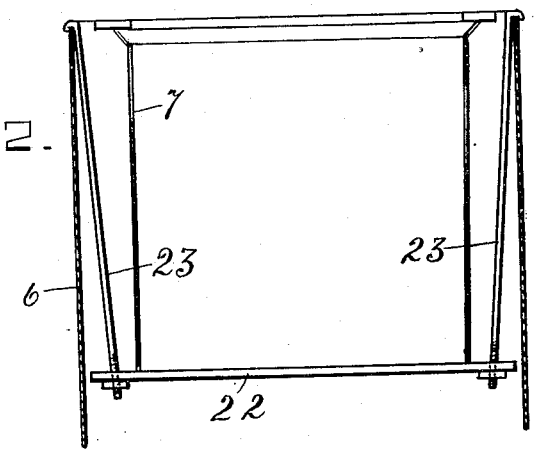
Witnesses
F. Dittmar
K. C. Swett.
Inventor
John Ericsson Harvey.
By Chas. D. Swett
Attorney

J. E. HARVEY.
ELECTRIC HEATER.
APPLICATION FILED MAR. 9, 1912.

1,033,799.

Patented July 30, 1912.
2 SHEETS—SHEET 2.

Fig. 3.

Fig. 4.

Witnesses
F. Dittmar
K. C. Swett

Inventor
John Ericsson Harvey,
By
Chas. D. Swett,
Attorney

UNITED STATES PATENT OFFICE.

JOHN ERICSSON HARVEY, OF MILTON, MASSACHUSETTS.

ELECTRIC HEATER.

1,033,799.  Specification of Letters Patent.  Patented July 30, 1912.

Application filed March 9, 1912. Serial No. 682,769.

*To all whom it may concern:*

Be it known that I, JOHN ERICSSON HARVEY, citizen of the United States, residing at Milton, in the county of Norfolk and State of Massachusetts, have invented certain new and useful Improvements in Electric Heaters, of which the following is a specification.

This invention relates to electric heaters, and has especial reference to electric water heaters.

An important object of the invention is to reduce the cost of devices for heating purposes.

Another object of the invention is to simplify the construction of such devices, so that they may be brought into more general use.

Other objects and advantages of the invention will appear in the description and drawings, and be particularly pointed out in the claims.

The accompanying drawing illustrates a form of the device embodying the invention, in which—

Figure 1 is a side elevation of the completed device. Fig. 2 is a side elevation of a part of the device showing the structure of the bracing means employed. Fig. 3 is an elevation, in section as to its upper part, and Fig. 4 is a vertical section of a modification of a part of the invention.

The various features of the device are indicated by numeral characters, similar characters denoting corresponding parts in the different views.

Referring to the drawing, the numeral 5 designates the base of the heater, and 6, its outer casing. An open vessel 7 made of a good conductor of heat is disposed in the outer casing and widely spaced from it.

8 designates a removable cup, containing the water to be heated, and is provided with an annular flange 8ª which rests on a gasket 9ᵇ. This gasket is seated in a recess in the top of the casing 6. This cup should taper slightly from top to bottom, and the space 10 between it and the vessel 7 is provided with water which receives heat from an electric current and communicates it to the water in the cup.

The space between the casing 6 and the vessel 7, is filled with electrical insulating material 4, a portion of this material is wound about with wire 9, having a high electrical resistance. The coil 9, and the material 4, contiguous to it, are inclosed in the insulation 9ª and stand in contact with the vessel 7. A zinc tube 12 is located within, and to one side of the vessel 7, having its lower end soldered to the bottom of said vessel and with its upper end vertically movable by expansion. 13 is a steel rod passing down through a brass nut 14, the zinc tube 12 and the bottom of the vessel 7, and is hinged to an insulated plate 40, on the switch lever 34. The insulation 16 prevents the current from entering the vessel 7. A hard rubber ring 17 insulates the screw 18. The plate 19 has a hinge connection 20 with a switch lever 34.

A strip of brass 22 (see Fig. 2) is soldered to the bottom of the vessel 7, through the ends of which pass brass rods 23, and the upper ends of these rods are secured to the inside of the casing 6, by which means the parts 6 and 7, are connected and rendered stable.

Any desired number of bolts 38, extend from the interior of the base 5 vertically through the bottom of the vessel 7, and being provided with binding nuts 38ª, afford means for tightening the casing firmly upon the base 5. The base 5 has a recess 30, in which is seated a brass tubing 31. A screw 43 in said tubing carries at its upper end a platinum contact 33. The screw works in a sleeve 32. A switch lever 34 is provided with a platinum contact 36, which is adapted to contact with the point 33.

In Fig. 4 is shown a modification of the parts just described, in which a plate 49 extends across the recess 30ª in the base 5ª and is held in place by a screw 43ᵇ. 43ª designates the adjustable contact screw, and 34ª, a switch lever. This form of construction is preferred to the other being simpler and cheaper.

The device is operated as follows. The vessel 7 is filled with water to the point or bead 48; the removable cup 8, is then filled with water and placed in position, when the water will rise nearly to the top of the vessel 7. When the water is cold, the switch lever 34, will be in contact with the regulating screw 43, or 43ª, the current passing from the terminal, *y*, through the screw 43, or 43ª, switch 34, or 34ª, the coil 9 and down to the terminal *z*. As the water becomes heated in the vessel 7, it causes the zinc tube 12 to expand, raising the brass nut 14, which is soldered to it and so lifting the switch lever 34 by means of the steel rod 13, and so breaking the electric circuit by separating the contact points 33 and 36. As the water cools the tube 12 contracts, reversing the movement of the switch which brings together again the contact points 33 and 36 and sets in operation again the heat generating energy of the electrical current, automatically.

I do not limit myself to the exact structure described above, as for instance, the zinc tube may be made of some other material or in a form other than a tube, and other parts of the device may be varied in certain particulars without departing from the spirit of the invention.

What I claim and desire to secure is:—

1. An electric heater comprising a base, a casing thereon, a vessel in said casing and widely spaced therefrom, refractory material between said casing and said vessel, a high resistance coil in said material, insulation inclosing said coil and contiguous portions of said material, a zinc member whose lower end rests upon the bottom of said vessel and is secured thereto, a nut on the upper end of said zinc member, a metal rod with the threaded upper end to engage said nut, and whose lower end operates to make and break the electric circuit.

2. In an electric heater a base, a casing thereon, a vessel in said casing, refractory material and a resistance coil between said casing and said vessel, a downwardly tapering cup in said vessel with an interposed water space between them, an expansible tube in said vessel, a rod in said tube connected thereto at its upper end, its lower end being pivotally connected to a plate, an electric switch lever carrying said plate, an adjustable switch screw in said base, said switch screw and coil being put in and out of circuit by the expansion of said tube by heat.

3. An electric heater comprising a base, a casing thereon, a vessel in said casing and widely spaced therefrom, refractory material between said casing and said vessel, a high resistance coil in said material, a receptacle in said vessel, an expanding member whose lower end rests on the bottom of said vessel and is secured thereto, a nut on the upper end of said member, a metal rod having a threaded upper end to engage said nut and whose lower end is pivotally connected to a plate, an electric switch carrying said plate, said base having a recess, and an adjustable switch screw in said recess, adapted to contact with said switch lever.

4. In an electric heater having a base and a casing thereon, a vessel in said casing and spaced therefrom, refractory material and an electric coil in said space, an electric switch lever in contact with said coil, thermostatic means actuating said switch lever, said base having a recess and means therein carrying a contact point adapted to contact with said switch-lever whereby the degree of heat is regulated automatically.

5. In an electric heater having a base, and a casing thereon a vessel in said casing spaced therefrom, a resistance coil and insulating material in said space, said base having a recess, a plate over said recess, means to hold said plate in position, a contact screw threaded through said plate and a switch lever adapted to contact with said screw.

In testimony whereof I affix my signature in presence of two witnesses.

JOHN ERICSSON HARVEY.

Witnesses:
 HELEN S. ROBBINS,
 REGINALD L. ROBBINS.